(12) United States Patent
El Kolli

(10) Patent No.: US 7,075,937 B1
(45) Date of Patent: Jul. 11, 2006

(54) METHOD AND DEVICE FOR SENDING DATA, METHOD AND DEVICE FOR RECEIVING DATA

(75) Inventor: Yacine Smail El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,119

(22) Filed: May 19, 1999

(30) Foreign Application Priority Data

May 19, 1998 (FR) .................................. 98 06307
May 19, 1998 (FR) .................................. 98 06308

(51) Int. Cl.
*H04L 12/28* (2006.01)

(52) U.S. Cl. ..................... 370/395.65; 370/395.63; 370/395.6

(58) Field of Classification Search ............. 370/395.1, 370/395.2, 395.3, 395.31, 395.4, 395.42, 370/395.43, 395.5, 395.51, 395.63, 395.64, 370/395.65, 397, 398, 409, 399
See application file for complete search history.

(56) References Cited

U.S. PATENT DOCUMENTS

| | | | | |
|---|---|---|---|---|
| 5,440,551 | A | * | 8/1995 | Suzuki ..................... 370/60 |
| 5,613,069 | A | | 3/1997 | Walker ................. 395/200.15 |
| 5,689,550 | A | * | 11/1997 | Garson et al. .............. 379/89 |
| 5,864,738 | A | * | 1/1999 | Kessler et al. ............ 709/239 |
| 5,959,995 | A | * | 9/1999 | Wicki et al. ............... 370/400 |
| 6,148,000 | A | * | 11/2000 | Feldman et al. .......... 370/397 |

FOREIGN PATENT DOCUMENTS

| | | |
|---|---|---|
| EP | 0479478 | 4/1992 |
| WO | WO 97/31464 | 8/1997 |
| WO | 97/36453 | 10/1997 |
| WO | WO 97/36453 | * 11/1997 |

OTHER PUBLICATIONS

Boudec et al., "Connectionless data service in an ATM-based customer premises network" Computer Networks ISDN Systems, vol. 26, No. 11, Aug. 1, 1994, pp.1409-1424.
M.C. Hammer et at., "Source Routing Bridge Implementation," IEEE Network, vol. 2, No. 1, Jan. 1988, pp. 33-36.

(Continued)

*Primary Examiner*—Duc Ho
*Assistant Examiner*—Thien D. Tran
(74) *Attorney, Agent, or Firm*—Fitzpatrick, Cella, Harper & Scinto

(57) ABSTRACT

This method applies to the transmission of information during a communication session, on a network having at least one switch, over at least one path between a so-called "source" node and a so-called "destination" node.

Figure 1:
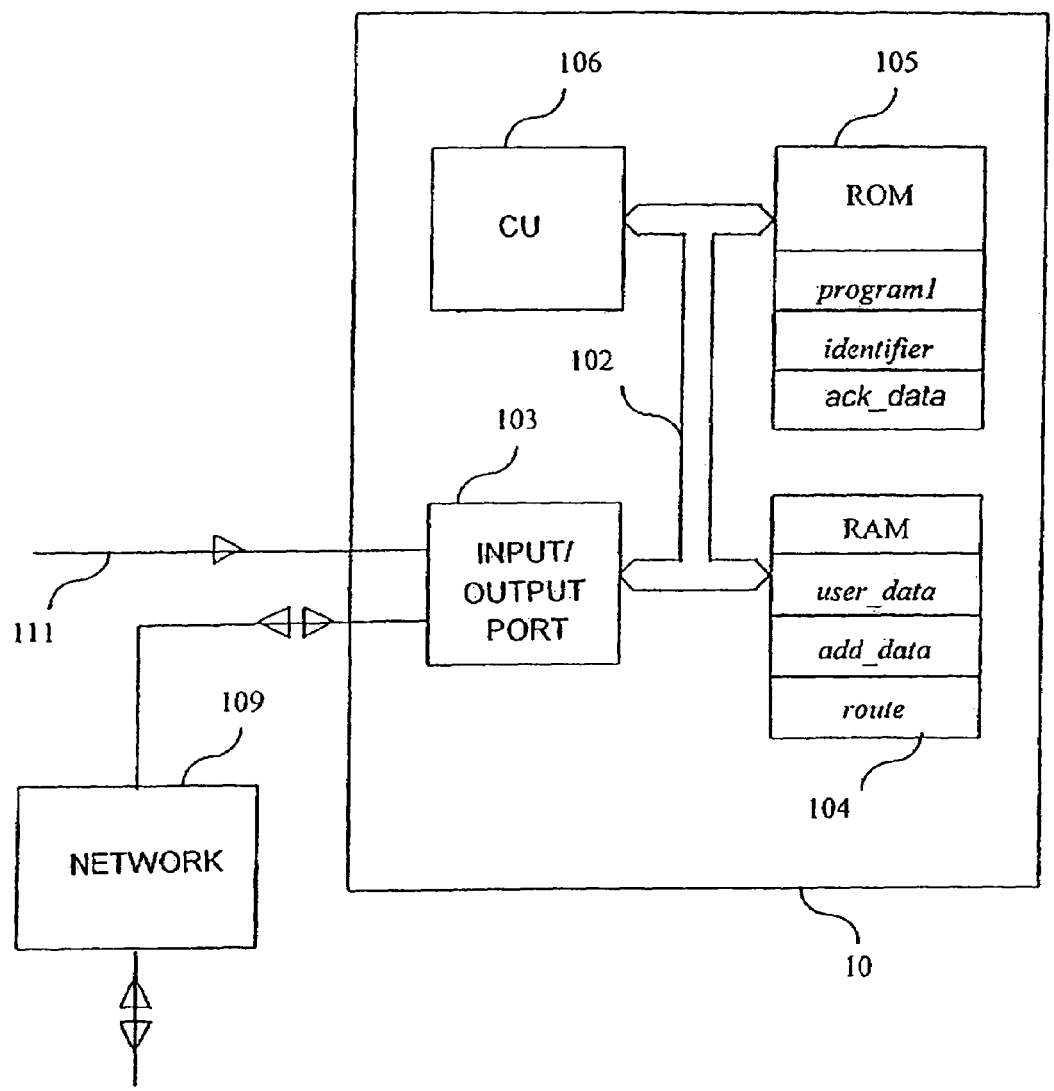

The network is adapted to transmit data according to at least one connected mode and at least one non-connected mode. The session includes the transmission of at least one packet including on the one hand "user" data and on the other hand additional data defining notably the path on the said network which the said user data will follow.

Each time a packet is received, the destination node performs:
an operation of reading the said additional data (601), and
an operation of determining the transmission mode (602), connected or non-connected, taking into account at least some of the said additional data.

18 Claims, 11 Drawing Sheets

OTHER PUBLICATIONS

Tanenbaum, "Computer Networks, Third Edition" 1996, Prentice Hall Int., pp. 314-315.

French Search Report (dated Feb. 4, 1999).

* cited by examiner

METHOD AND DEVICE FOR SENDING DATA, METHOD AND DEVICE FOR RECEIVING DATA

The present invention concerns a method and device for sending data, a method and device for receiving data and systems using them.

In the currently known methods of transmitting over a switched network:

the packet switching protocols such as the ATM (initials of the words "Asynchronous Transfer Mode") or X25 protocols are too complex to implement and use in local networks, and low-level packet switching protocols, such as the "IEEE 1355" protocol, do not provide all the qualities expected of transmission on a network, such as:

management of priorities, the coexistence on the network of packets transmitted in "made-reliable" mode and in "non-made-reliable" mode and/or the coexistence on the network of packets transmitted in connected mode and in non-connected mode.

More generally, in the prior art, two independent protocol layers can be used, one for transmissions in connected mode and the other for transmissions in non-connected mode. The result is not efficacious where routing is effected by the source node.

There is known from the document EP 0 479 478 a method of transmitting packets of data both in connected and non connected transmission modes over a packet switched network.

This method makes provision for reserving a predetermined connection which is used for transmitting packets of data in non connected transmission mode only.

However, this method is not flexible since a predetermined connection has to be set up.

It is also known from the document WO 9736453 a method of transmitting packets of data both in connected and non connected transmission modes over a switched packet network.

This method proposes to add information in a header of a packet of data so as to indicate if the transmission mode of said packet is a connected or a non connected one.

This enables switches which are disposed on the path of said packet in the switched network to process said packet according to either the connected or non connected transmission mode.

However, it would be more efficient to find a method which does not require to add any specific information, the purpose of which is only to indicate the mode of transmission used by the packet of data.

The present invention sets out to remedy these drawbacks.

In general terms, the present invention consists of combining the means and advantages of packet source routing and of the transmission, in the packet header, of information (virtual channel and source node) enabling the node for which the packet is intended to determine whether this packet has been transmitted in connected mode or in non-connected mode. It should be noted here that these transmission modes do not entail the same data processing in the destination node and that determining the transmission node enables this mode to function more effectively.

Thus the present invention relates to a method of transmitting on a network having at least one switch enabling information to be transmitted on at least one path between a source node and a destination node during a communication session, the said network being adapted to transmit data in at least one connected mode and at least one non-connected mode, the said session including the transmission of at least one packet, each packet including user data and additional data defining notably the path on the said network which the said user data will follow, when each packet is received, the destination node performs:

an operation of reading the said additional data, and an operation of determining the transmission mode, connected or non-connected, taking into account at least some of the said additional data, characterised in that, the said additional data include a data item representing a virtual channel and a data item representing the source node and, during the determination operation, the destination node takes into account the said data items representing both the virtual channel and the source node in order to determine the transmission mode, connected or not.

The present invention also relates to a method of sending by a source node, on a network having at least one switch, enabling information to be transmitted on at least one path between the node and a destination node during a communication session, the said network being adapted to transmit data in at least one connected mode and at least one non-connected mode, the said session including the transmission of at least one packet, each packet including user data and additional data defining notably the path on the said network which the said user data will follow, characterised in that:

at each sending of information in connected mode, the source node performs an operation of reserving a virtual channel between the said source node and the said destination node, a virtual channel which the said information will follow, and at each sending of a packet of the said information, in connected mode, the source node performs an operation of determining the said additional data, during which the said additional data determined represent:

on the one hand a unique identifier of the source node in the said network, and on the other hand, the said virtual channel.

The present invention further relates to a method of receiving by a destination node, on a network having at least one switch, for receiving information on at least one path coming from a source node, the said network being adapted to transmit data in at least one connected mode and at least one non-connected mode, the said session including the transmission of at least one packet, each packet including user data and additional data defining notably the path on the said network which the said user data will follow, when each packet is received, it includes:

an operation of reading the said additional data, an operation of determining the transmission mode, connected or non-connected, taking into account at least some of the said additional data, characterised in that, the said additional data include a data item representing a virtual channel and a data item representing the source node and, during the determination operation, the destination node takes into account the said data items representing both the virtual channel and the source node in order to determine the transmission mode, connected or not.

By virtue of the arrangements of each of these aspects of the present invention, the destination node can determine the mode of transmission of each packet which it receives and can deal with this packet accordingly without adding any information which is only specific to the mode of transmission in the connected or non connected form.

As a matter of fact, the present invention proposes to determine whether a received packet has been transmitted in connected or non connected mode thanks to the data items representing a virtual channel and the source node only by checking, in the destination node, whether said virtual channel and said source node have already been allocated to a packet transmission.

If this is true, then this means that the received packet has been transmitted in a connected mode.

Otherwise, the packet has been transmitted in a non connected mode.

It must be taken into account that the data items representing a virtual channel and the source node are used for the purpose of the patent invention but they were used previously for other purposes: reassembling of packets so as to form a message, acknowledgement procedure . . .

The invention therefore enables a switched network to be made flexible, without using a complex protocol and without reserving a specific channel in the network for non connected transmissions.

Also, by virtue of the arrangements of each of these aspects of the present invention, implementation of the method of the invention is particularly simple and efficient. As a matter of fact, given that the source node places in additional data information relating to the virtual channel the user data must follow and a source node identifier which it has on the network, this thus enables the destination node to identify the virtual channel used by said user data, without any ambiguity.

It should be noted here that packets transmitted in accordance with the method of the present invention can be made reliable or not, that is to say can entail the sending, on the network, by the node to which the user data are sent, to the node which is the source of these data, of an acknowledgement packet enabling the source node to know that the user data have been correctly received by the destination node.

According to particular characteristics:

the destination node has a memory in which additional reference data are stored and the operation of determining the transmission mode includes an operation of comparing the said additional reference data and additional data read during the reading operation, and, preferentially, during the transmission mode determination operation, the transmission mode is determined as connected when the said additional data are identical.

By virtue of these provisions, the processing of the additional information by the destination node is particularly simple.

The invention also relates to a camera, a facsimile machine, a photographic apparatus, a computer and a television receiver, characterised in that they have a device as briefly disclosed above.

The invention also relates to:

an information storage means which can be read by a computer or a microprocessor, storing instructions of a computer program characterised in that it enables the method of the invention as briefly disclosed above to be implemented, and a partially or totally removable information storage means which can be read by a computer or a microprocessor, storing instructions of a computer program characterised in that it enables the method of the invention as briefly disclosed above to be implemented.

The particular characteristics and the advantages of the above-mentioned devices of the invention, of the said camera, of the said facsimile machine, of the said photographic apparatus, of the said computer, of the said television receiver and of the said information storage means being identical to those of the method to which the first aspect of the invention relates, they are not restated here.

According to a second aspect, the present invention concerns a method and device for sending data, a method and device for receiving data and systems using them.

In the currently known methods of transmitting over a switched network:

the packet switching protocols such as the ATM (initials of the words "Asynchronous Transfer Mode") or X25 protocols are too complex to implement and use in local networks, and low-level packet switching protocols, such as the "IEEE 1355" protocol, do not provide all the qualities expected of a transmission on a network (priority, sharing of reliable and non-reliable modes, etc).

It is known from the document WO 9731464 a method of transmitting packets of data over a switched packet network using source routing and requiring no storage of said packets of data in switches of the network.

According to this method, the packets are acknowledged when successively transmitted and are sent again after a predetermined period of time if no acknowledge is received.

However, this method does not enable the management of the network. It is to be noted that management of the network is mainly concerned with the setting up of connections for the transmission of packets data.

The present invention sets out to remedy these drawbacks.

In general terms, the present invention consists of combining the means and advantages of packet source routing and of the transmission of a unique identifier of the node which sends the packet on the said network and of a virtual channel which said packet must follow, in the header of the packet, in order to make the transmission reliable by enabling the node which receives the packet to transmit, in return, an acknowledgement of reception of the packet.

Thus the present invention relates to a method of transmitting user data on a switched network between a source node having a unique identifier on the said network and a destination node, a method including, performed by the source node:

an operation of determining additional outward data defining notably, in its entirety, the path to be followed on the said network by the said user data, and an operation of sending, by the source node, at least one packet of said user data and the said additional outward data which relate to it, during the additional outward data determination operation, the source node defining additional outward data representing the said unique identifier of the source node, and the method including, performed by the destination node, on reception of each packet:

an operation of reading the said identifier in the said additional outward data, and an operation of checking the correct reception of the user data and, in the event of correct reception:

an operation of determining additional return data defining notably a path going from the said destination node to the node identified by the said identifier, and an operation of acknowledging by sending acknowledgement data indicating the correct reception of the said user data and of the said additional return data.

characterised in that:

during the additional outward data determination operation, the source node defines additional outward data representing a virtual channel which the said user data must follow, the unique identifier of the source node being placed in addition to said virtual channel, thereby enabling the destination node to identify the virtual channel used by the user data, without any ambiguity.

The present invention also relates to a method of sending user data over a switched network used by a source node having a unique identifier on the said network for transmitting user data to a destination node, a method including:

an operation of determining additional outward data defining notably, in its entirety, the path to be followed on the said network by the said user data, and an operation of sending, by the source node, at least one packet of said user data and the said additional outward data which relate to it, characterised in that the additional data determined during the additional outgoing data determination operation represent the said unique identifier of the source node in addition to the virtual channel which the said user data must follow.

The present invention further relates to a method of receiving, by a destination node, user data on a switched network, data coming from a source node having a unique identifier on the said network, said method including on reception of each packet coming from the source node, and performed by the destination node:

an operation of reading an identifier in additional outward data transmitted, in the said packet, with user data, and an operation of checking the correct reception of the user data and, in the event of correct reception:

an operation of determining additional return data defining notably a path going from the said destination node to the node identified by the said identifier, and an operation of acknowledging by sending acknowledgement data indicating the correct reception of the said user data and of the said additional return data, characterised in that:

it more particularly includes an operation of reading said unique source node identifier, in addition to a virtual channel which the said user data must follow.

By virtue of the provisions of each of the aspects of the present invention, a centralised management of the network and particularly of virtual channels used by user data is not required.

A centralised management would imply that a virtual channel number be allocated once for all the nodes of the network.

In contrast, the present invention makes management of the network easier since it does not require any centralised procedure.

As a matter of fact, according to the present invention, each source node defines a virtual channel number in addition to its unique identifier, thereby enabling the destination node to identify the virtual channel used by the user data without any ambiguity.

It is to be noticed that the present invention does not prevent the use of a same virtual channel number for two different source nodes.

Also, the source node is informed of the correct reception of the transmitted user data, or, when it does not receive any acknowledgement data, it can assume that the user data which it sent have not been correctly received. In the latter case, it can implement various procedures intended to correct, at least partially, the fault in the transmission of the packet, such as, for example, the repeated sending of the transmitted packet.

The invention therefore makes it possible to make a switched network reliable.

According to particular characteristics:

during the additional return data determination operation, the destination node determines the additional return data representing the virtual channel which the acknowledgement data must follow, and/or during the additional return data determination operation, the destination node incorporates, in the additional return data, a virtual channel identifier represented by additional data received from the source node.

By virtue of these provisions, the invention is particularly simple to implement. In addition, the source node can transmit simultaneously on several virtual channels without awaiting the acknowledgement concerning the packets already sent. Finally, in return, it is not necessary to send the identifier of the destination node to the source node.

The present invention relates to a device for transmitting user data on a switched network between a source node having a unique identifier on the said network and a destination node, the said source node having:

a means of determining additional outward data defining notably, in its entirety, the path to be followed on the said network by the said user data, and a means of sending, by the source node, at least one packet of said user data and the said additional outward data which relate to it, the additional outward data determination means of the source node being adapted to define additional outward data representing the said unique identifier of the source node, and the destination node having:

a means of reading the said identifier in the said additional outward data of each packet, and processing means adapted to:

check the correct reception of the user data and, in the event of correct reception, determine additional return data defining notably a path going from the said destination node to the node identified by the said identifier, and a means of sending acknowledgement data indicating the correct reception of the said user data and of the said additional return data.

characterised in that:

the additional outward data determination means is adapted to define additional outward data representing a virtual channel which the said user data must follow, the unique identifier of the source node being placed in addition to said virtual channel, thereby enabling the destination node to identify the virtual channel used by the user data without any ambiguity.

The present invention moreover relates to a device for sending user data on a switched network, from a source node having a unique identifier on the said network, having:

a means of determining additional outward data defining notably, in its entirety, the path to be followed on the said network by the said user data, in order to reach a destination node, and a means of sending at least one packet of said user data and of the said additional outward data which relate to it, characterised in that:

the means of determining additional outward data is adapted to define additional outward data representing the said unique identifier of the source node, in addition to a virtual channel which the said user data must follow.

The present invention further relates to a device for receiving, by a destination node, for receiving user data on a switched network, data coming from a source node having a unique identifier on the said network said device having:

a means of reading an identifier in additional outgoing data transmitted, in the said packet with user data, and processing means adapted to check the correct reception of the user data, to determine additional return data defining notably a path going from the said destination node to the node identified by the said identifier, means of sending on the one hand additional return data and on the other hand acknowledgement data indicating the correct reception of the said user data.

characterised in that:

it more particularly includes a means of reading said unique source node identifier, in addition to a virtual channel which said user data must follow.

The invention also relates to a camera, a facsimile machine, a photographic apparatus, a computer and a television receiver, characterised in that they have a device as briefly disclosed above.

The invention also relates to:

an information storage means which can be read by a computer or a microprocessor, storing instructions of a computer program characterised in that it enables the method of the invention as briefly disclosed above to be implemented, and a partially or totally removable information storage means which can be read by a computer or a microprocessor, storing instructions of a computer program characterised in that it enables the method of the invention as briefly disclosed above to be implemented.

The particular characteristics and the advantages of the devices of the invention, of the said camera, of the said facsimile machine, of the said photographic apparatus, of the said computer, of the said television receiver and of the said information storage means being identical to those of the method to which the second aspect of the invention relates, they are not restated here.

Figure 2:
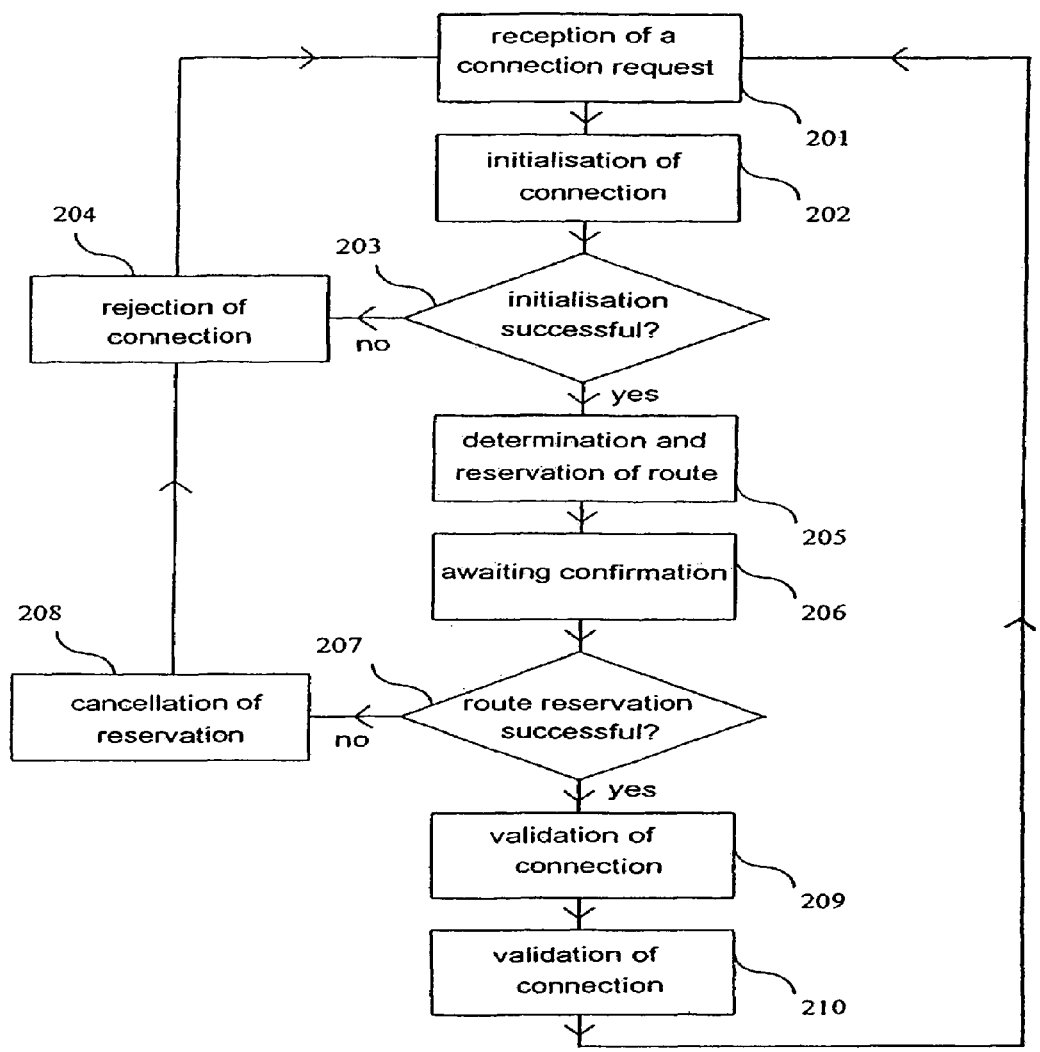
Figure 3:
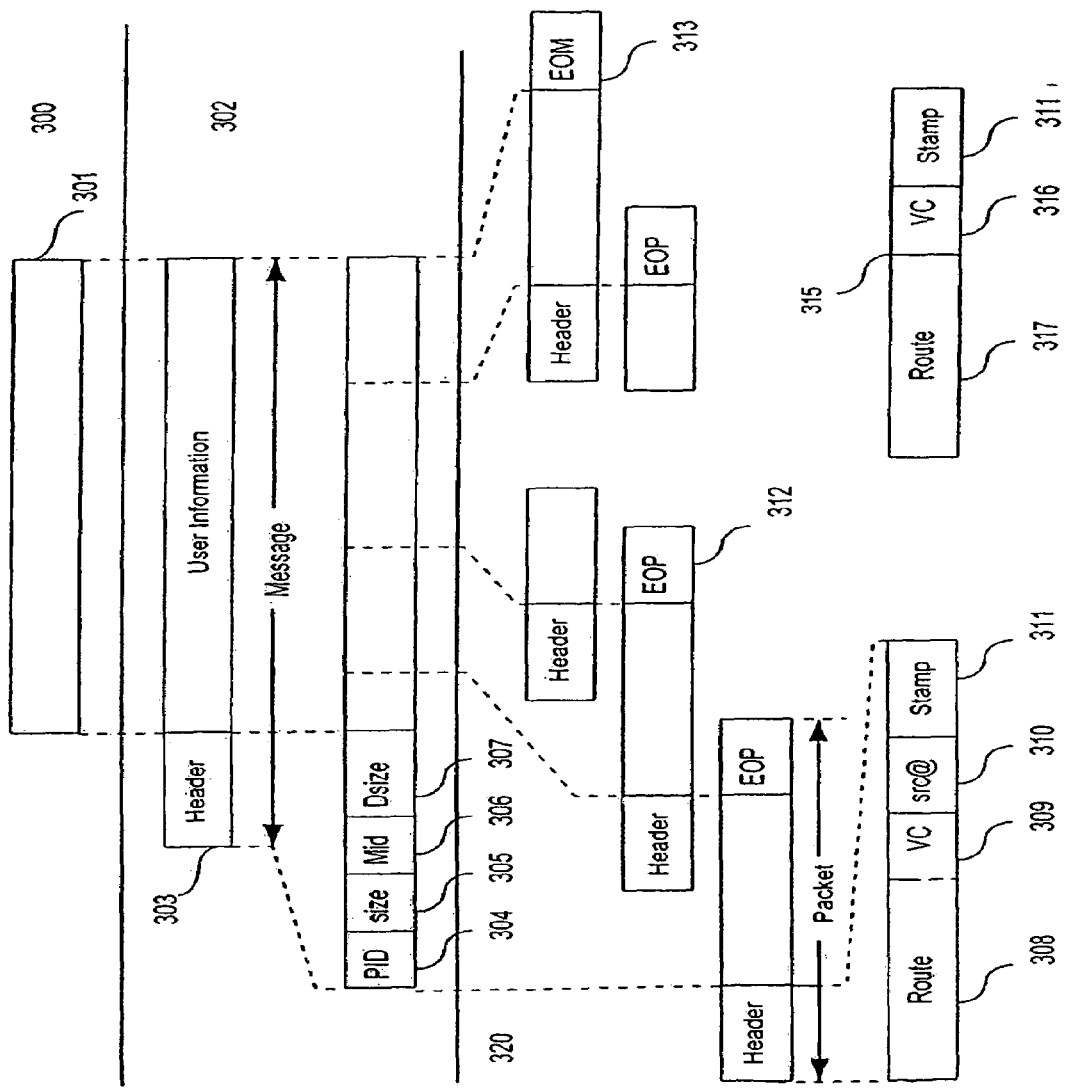
Figure 4:
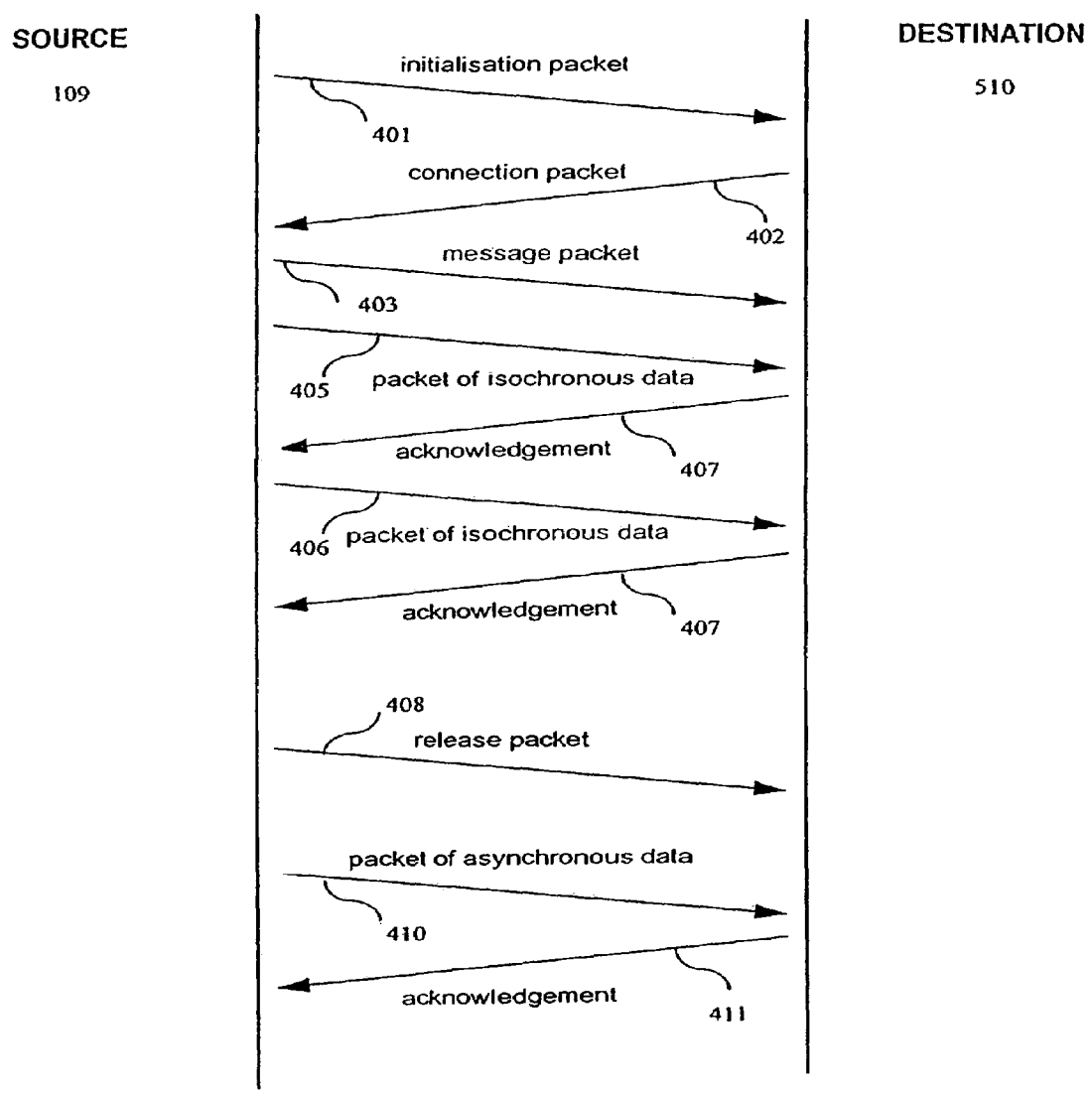
Figure 5:
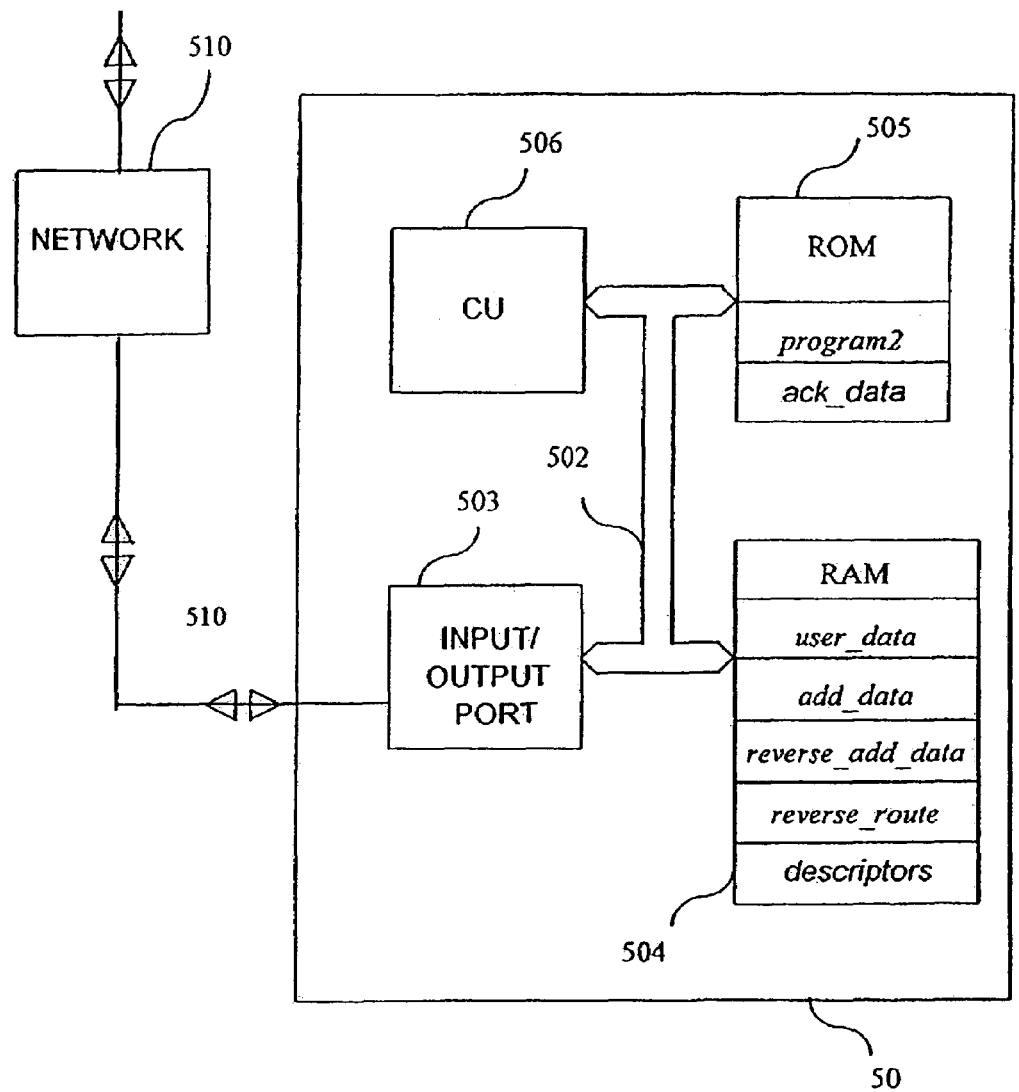
Figure 6:
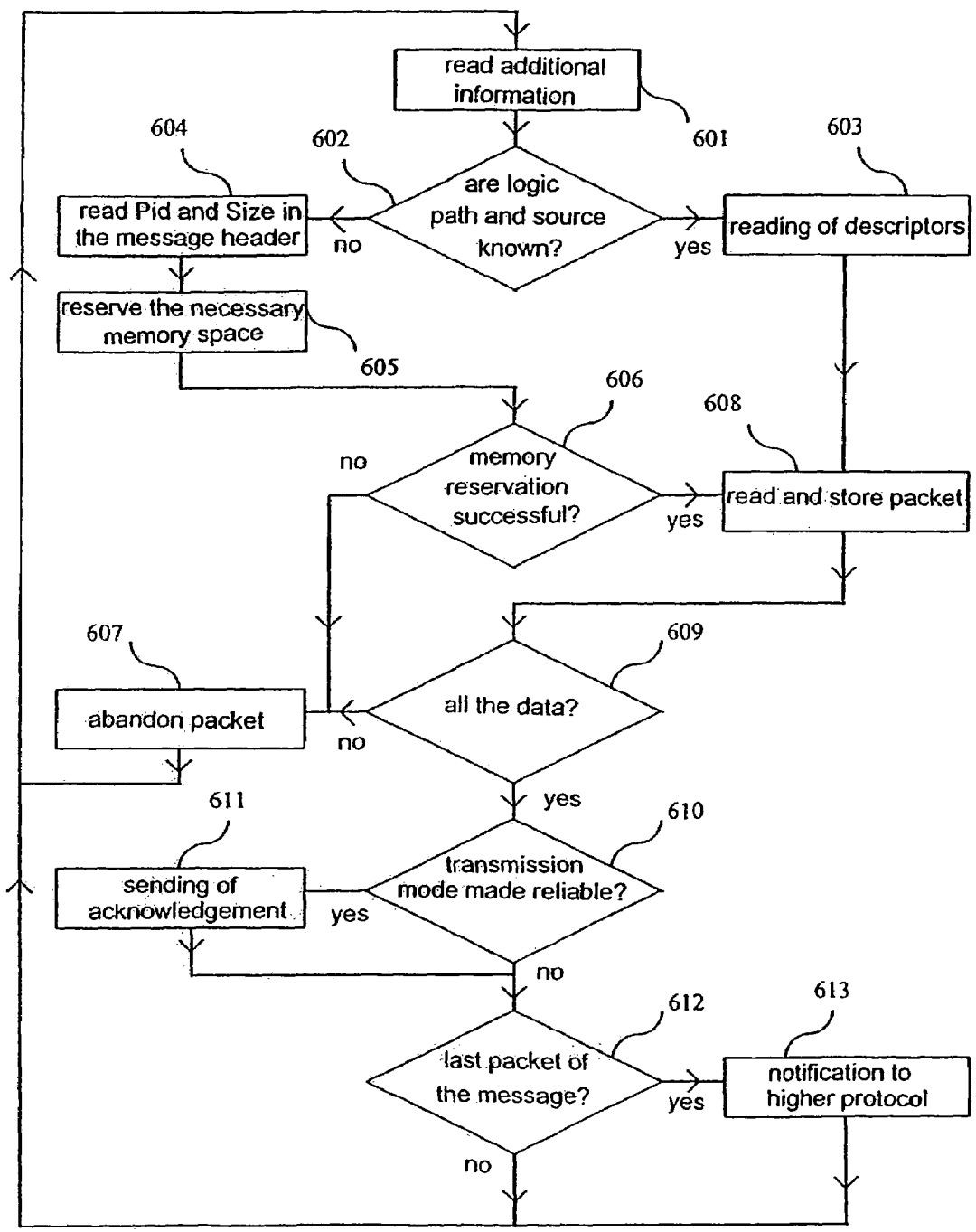
Figure 7:
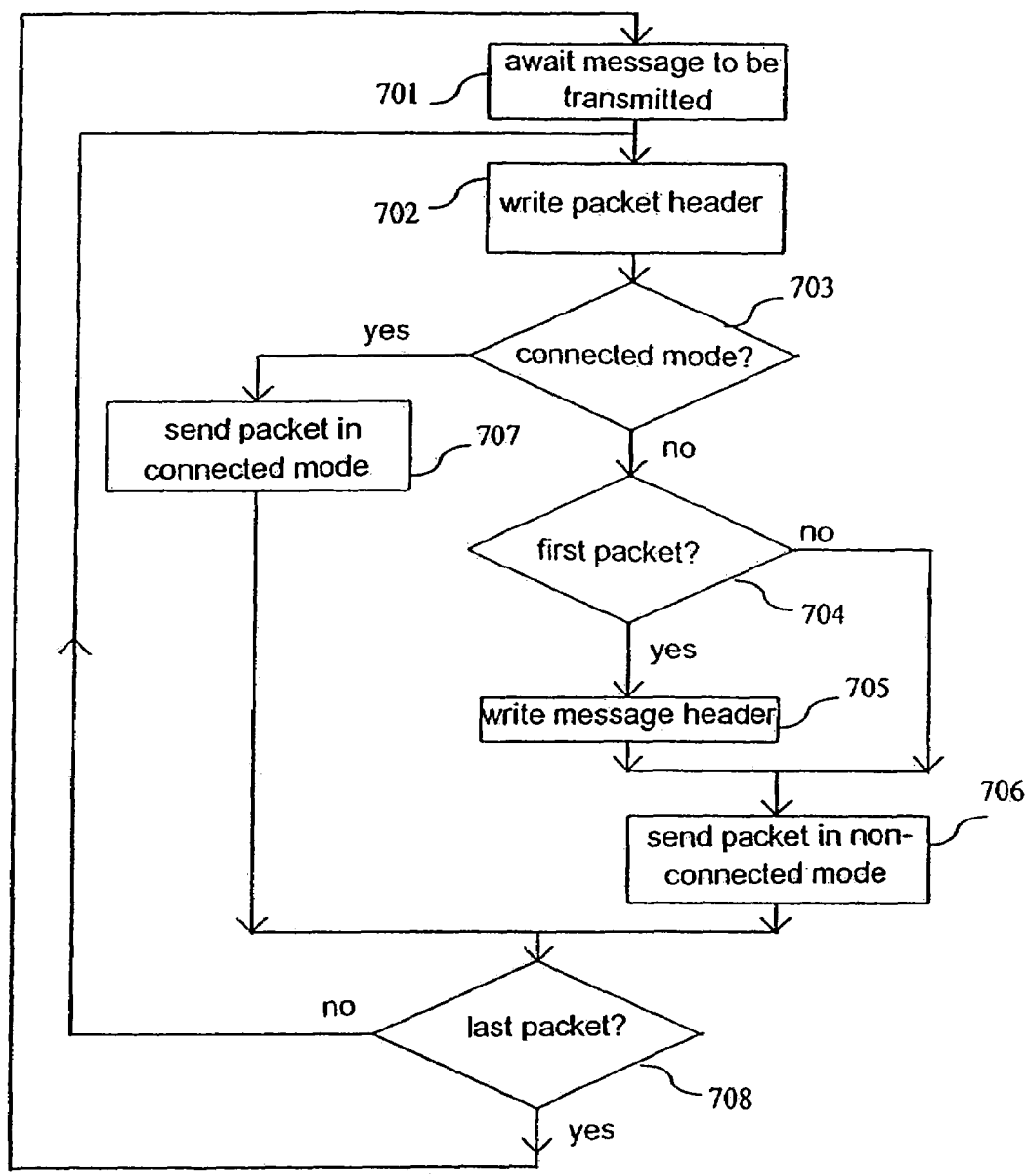
Figure 8:
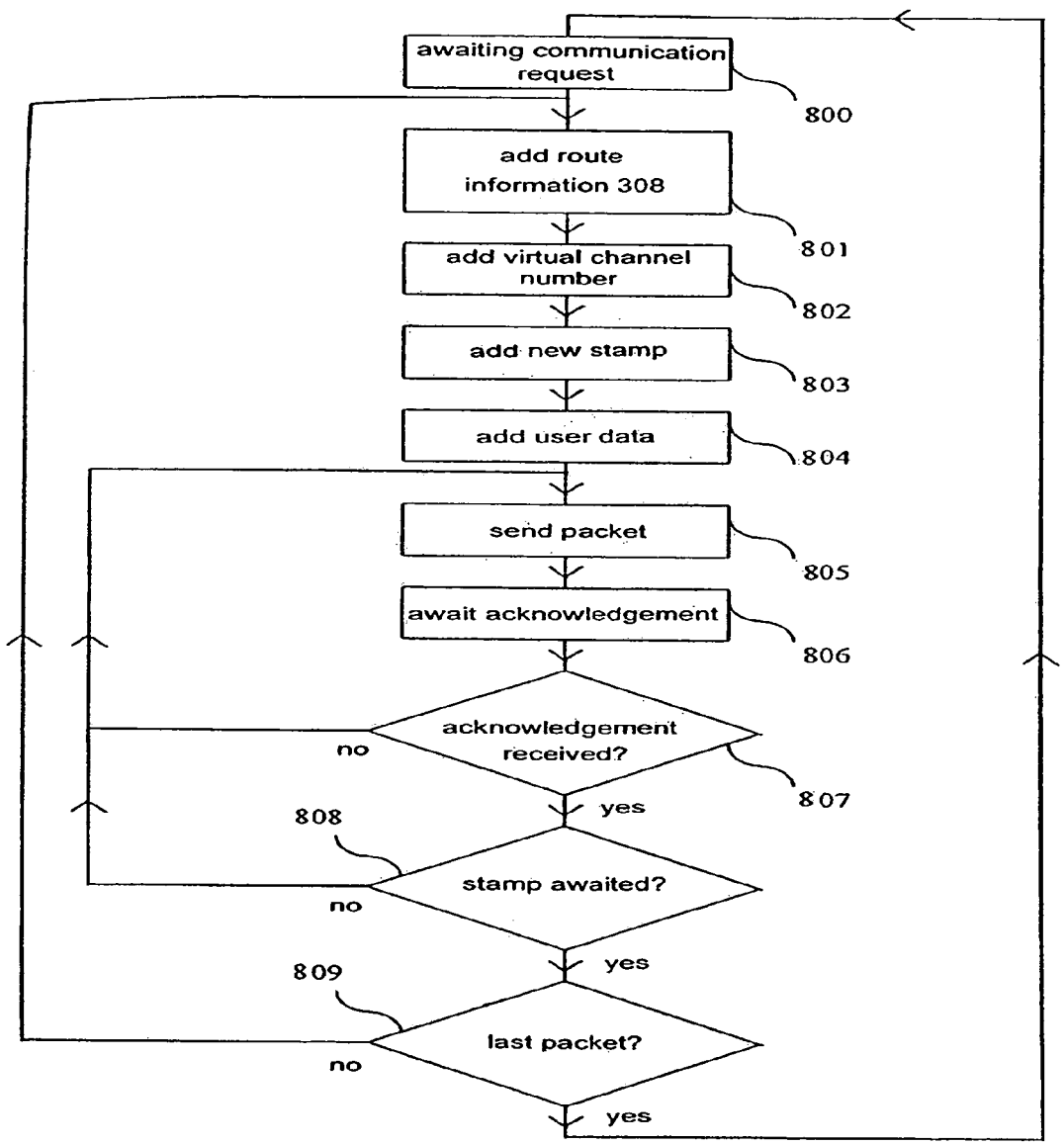
Figure 9:
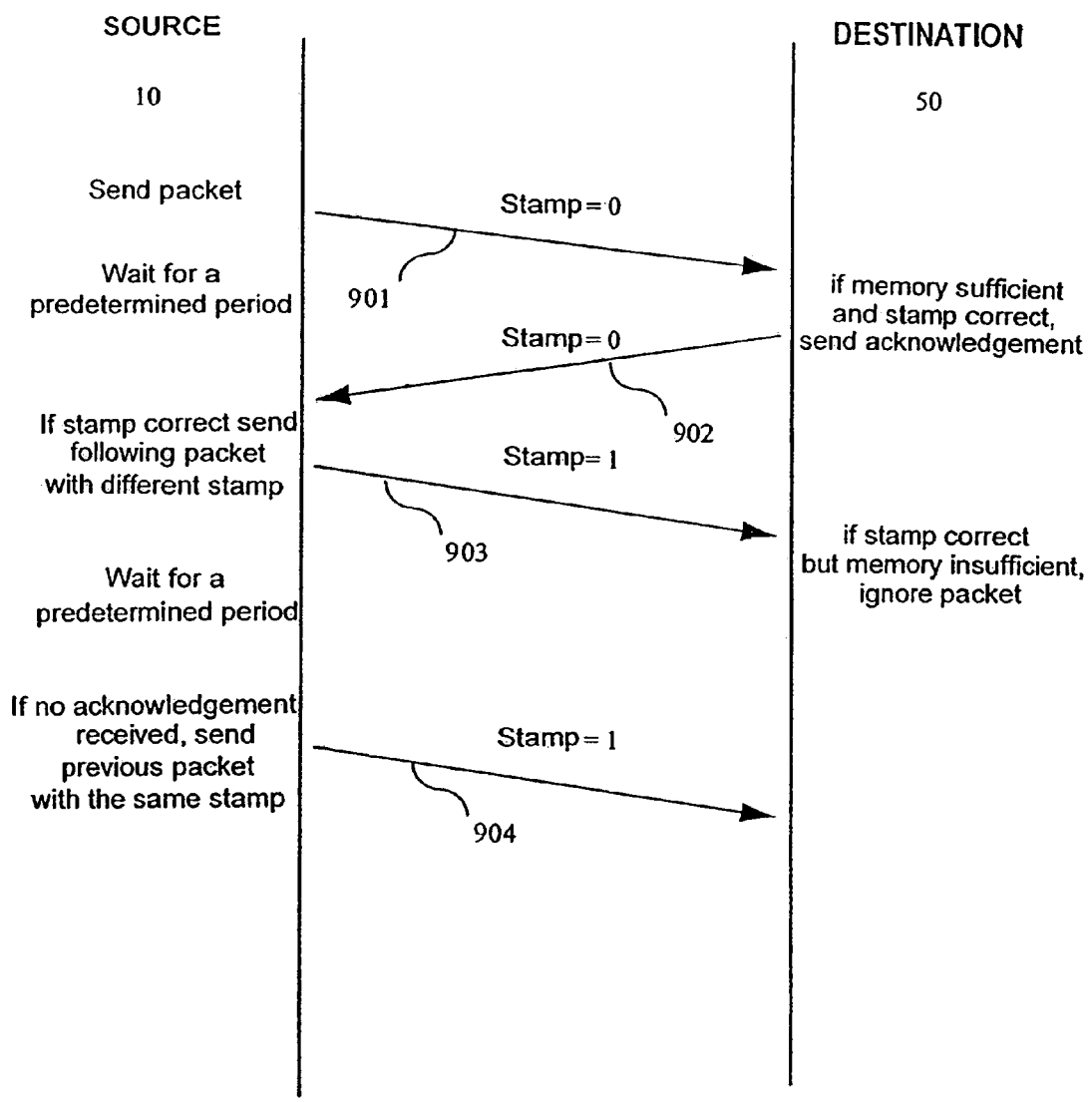
Figure 10A:
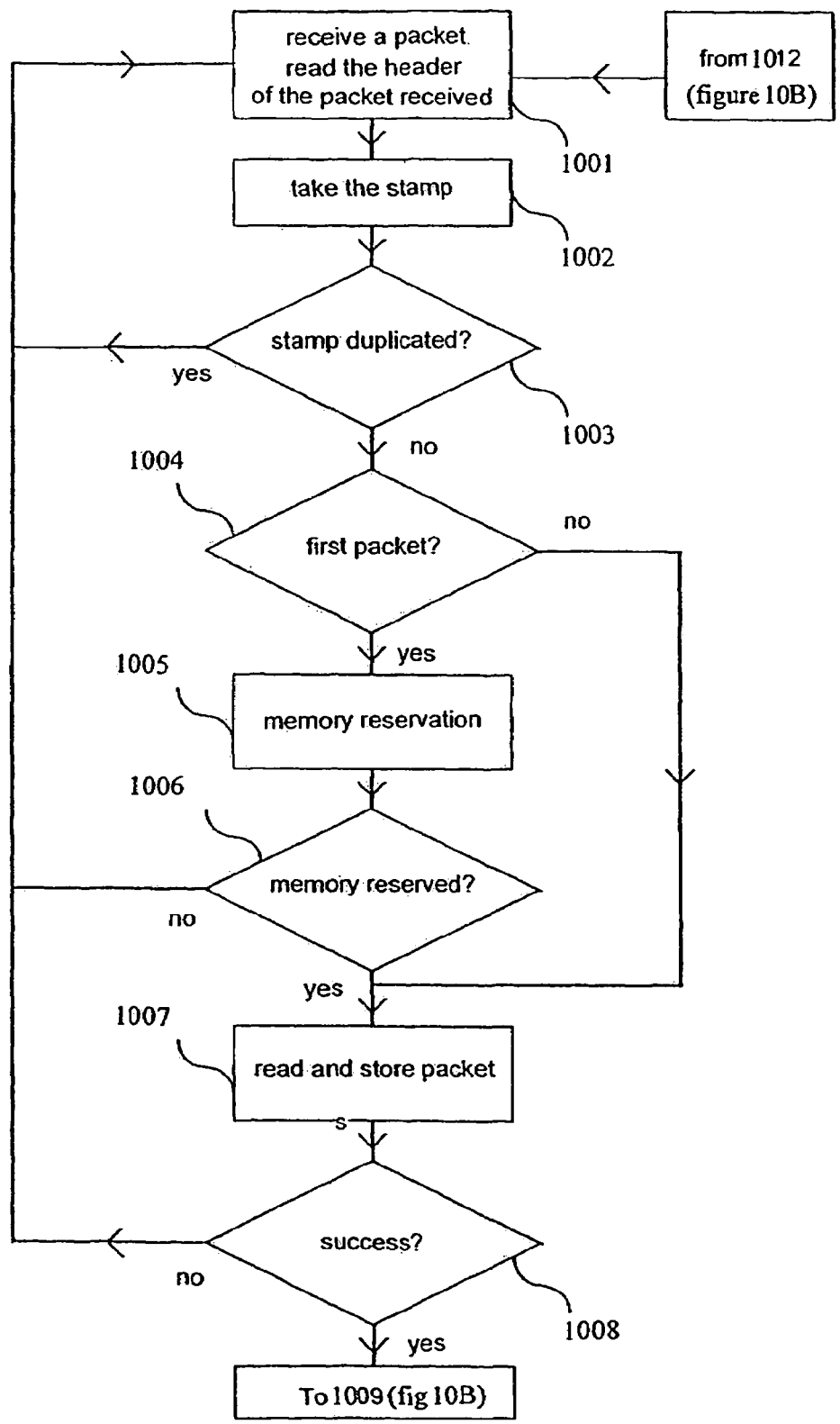
Figure 10B:
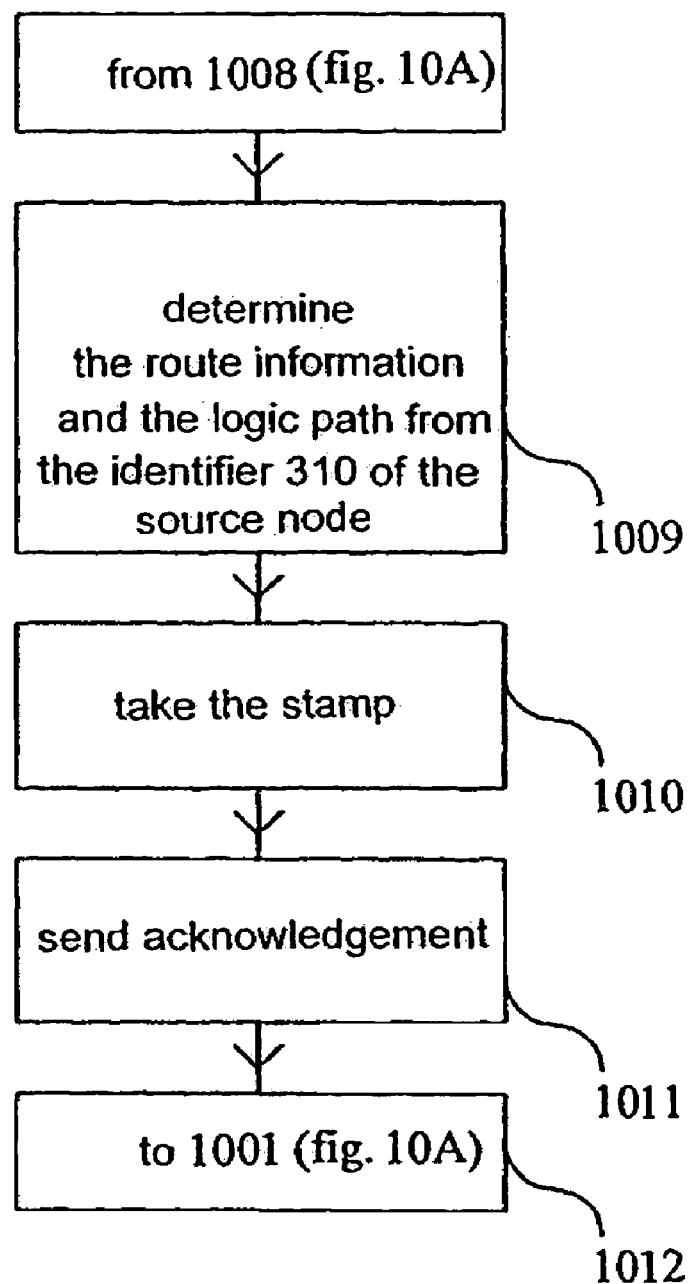

The invention will be understood more clearly from a reading of the following description, given with regard to the accompanying drawings in which:

FIG. 1 depicts a transmission device according to the present invention,

FIG. 2 depicts a flow diagram for making a connection used by the transmission device illustrated in FIG. 1, according to a first aspect of the invention, FIG. 3 depicts data processed by different sending and transmission protocol layers used by a transmission device as illustrated in FIG. 1, FIG. 4 depicts a succession of packets exchanged by means of a network, in accordance with a first aspect of the transmission method which is an object of the present invention, FIG. 5 depicts a reception device according to the present invention, FIG. 6 depicts a flow diagram for the operation of the reception device illustrated in FIG. 5, in accordance with a first aspect of the invention, FIG. 7 depicts a sending flow diagram implemented by the device illustrated in FIG. 1, according to a first aspect of the invention, FIG. 8 depicts a flow diagram for the operation of the transmission device illustrated in FIG. 1, according to a second aspect of the invention, FIG. 9 depicts a succession of packets exchanged by means of a network, in accordance with a second aspect of the transmission method of the invention, FIGS. 10A and 10B depict flow diagrams for the operation of the reception device illustrated in FIG. 1, in accordance with a second aspect of the invention.

In FIG. 1, the transmission device is illustrated in the form of a block diagram and depicted under the general reference 10 and has, connected together by an address and data bus 102:

a central processing unit 106;

a random access memory RAM 104;

a read only memory ROM 105;

an input/output port 103 serving to receive, in the form of binary data, so-called "user" information which the transmission device is to transmit, on the one hand, and to transmit information packets to a so-called "source" node 109 in a communication network, on the other hand;

and, independently of the bus 102, an input 111 for user information to be transmitted, the said input being connected to the input/output port 103.

Each of the elements illustrated in FIG. 1 is well known to persons skilled in the art of network transmission systems and, more generally, information processing systems. These elements are therefore not described here.

It should be noted here that the word "register" used below designates, in each of the memories, both a low-capacity memory area (storing only a few binary data) and a large-capacity memory area (enabling an entire program to be stored).

The random access memory 104 stores data, variables and intermediate processing results, in memory registers bearing, in the remainder of the description, the same names as the data whose values they store. The random access memory 104 contains notably:

a register "user_data" in which the user information to be transmitted is stored, information which includes, notably, the information coming from the input 111, a register "add_data" in which additional information to be transmitted is stored, information which notably defines, in its entirety, to the path be followed by the user data on the communication network, and a register "route" in which routing information is stored, describing a succession of nodes in the communication network which the user data can follow in order to reach an information reception device as illustrated in FIG. 5.

The read only memory 105 is adapted to store:

the operating programme of the central processing unit 106, in a register "program1", an identifier representing the transmission device 10, the said identifier being unique on the communication network, one or more items of information representing correct reception of information by a node to which information is sent, in a register "ack_data".

The read only memory 105 constitutes a means of storing information which can be read by a computer or a microprocessor, storing instructions of a computer program, characterised in that it enables the method of the invention to be implemented. According to a variant, the read only memory 105 is removable, partially or totally, and has for example a magnetic tape, a diskette or a fixed-memory compact disc (CD-ROM).

The central processing unit 106 is adapted to implement the flow diagrams described in FIGS. 2 and 8. In FIG. 2 it can be seen that, during an operation 201, the central unit 106 is in an operating state which does not require connection to the network, and then it receives, from a software application, a request for a connection. After reception of this request, during an operation 202, the central unit 106 initiates the connection in the transmission device 10, according to known methods. Then, during a test 203, the central unit determines whether or not all the components and/or subsystems of the transmission device are correctly initialised.

When the result of the test 203 is negative, during an operation 204, the central unit 106 returns to the application which sent the connection request an item of information signifying the rejection of the connection, and then the operation 201 is reiterated.

When the result of the test 203 is positive, during an operation 205, the central unit 106 determines the path to be followed by the user data in order to reach the reception device for which the user data are intended, places in the register "route" all the nodes through which the user data must pass in order to reach the node for which the user data to be transmitted are intended, and then sends, to each of the nodes in the series of nodes stored in the register "route" a connection reservation message intended to reserve a logic communication channel between the source node and the destination node (FIG. 5).

During an operation 206, the central unit 106 awaits, for a predetermined period, from each of the nodes to which the reservation method is sent, a message indicating that the connection is initialised. Next, during a test 207, the central unit 106 determines whether or not all the messages indicating that the connection is initialised has been received.

When the result of the test 207 is negative, during an operation 208, a connection rejection message is said by the transmission device 10, to each of the nodes to which the connection reservation message is sent (see operation 205). Then the operation 204 is reiterated.

When the results of the test 207 is positive, during an operation 209, a connection validation message is sent by the transmission device 10 to each of the nodes to which the connection reservation message was sent (see operation 205). Then, during an operation 210, the central unit 106 returns, to the application which sent the connection request, an item of information indicating that the connection is established, and then the operation 201 is reiterated.

The data packets which pass over the switched network consist mainly on the one hand of user information and on the other hand of a header including so-called additional information and, finally, end of packet or end of message information.

In FIG. 3, it can be seen that, for the user layer 300 of the communication protocol, a data frame 301 is transmitted to the message layer 302 of the communication protocol. In order to form the user data message, the layer 302 adds, to the data constituting the frame, a message header 303 including protocol identification information 304, message size information 305, memory identification information 306 and information 307 representing the size of the useful information within the meaning of the IPC protocol implemented by the "Chorus" (registered trade mark) operating system.

It should be noted here that the information 305 and 306 relates specifically to the "Chorus" operating system and are in no way related to the implementation of the invention.

The packet layer 320 forms, from this message, packets each including user data, and a packet header including:

route information 308 including information representing each node in the network through which the user information must pass, virtual channel number information 309, a source node identifier 310, and so-called "stamp" information 311, intended to enable any loss of the packet before reception to be controlled.

It should be noted here that, in connected mode, the header 303 is not transmitted in a packet whilst, in non-connected mode it is transmitted in the first packet of the message.

In the embodiment described and depicted, the route information is progressively extracted from the packet: each time a node in the network receives this packet, it determines, with the first part of the route information, which is the following node which will receive the packet, and it transmits the entire packet which it has received, with the exception of the first part. Thus the additional data sent by the source node are not completely received by the destination node. This mode of functioning of the network, and more particularly of its nodes or switches, is known as header deletion.

In the embodiment described and depicted, the stamp is binary and can therefore take two values in alternation. However, a larger number of values can be allocated to the stamp in order to increase the reliability of the methods and devices of the invention.

At the end of each packet, with the exception of the last one, there is a termination consisting of end of packet information 312. At the end of the last packet of the message, in place of the end of packet information, the packet layer places end of message information 313.

At the bottom right in FIG. 3, an acknowledgement data packet 315 is depicted, this packet being also referred to as "acknowledgement" in the remainder of the description. This acknowledgement is sent by the node which is the destination of a packet including user data intended for the source node, when the destination node has correctly received the user data.

It should be noted that the acknowledgement 315 includes solely:

route information 317 including information representing each node in the network through which the other acknowledgement information must pass, virtual channel number information 316, and the stamp 311 received with the user data.

It should be noted here that the virtual channel number information items 309 and 316 are identical. This is because this number is copied by the destination node into the additional outward data coming from the source node. In the additional data which accompany the user data, the source node places, in addition to the virtual channel number, the unique identifier which it has on the network, which enables the destination node to identify the virtual channel used by the user data, without any ambiguity.

On the other hand, in order to send the acknowledgement, the destination node does not have to send its unique identifier over the network, since the virtual channel number which it uses is already known to the source node. Thus the virtual channel identifier is sufficient to acknowledge reception.

In FIG. 4, there can be seen, indicated by downward sloping arrows placed in a central column, messages transmitted over the network, between a source node 109, on the left, and a destination node 510, on the right. The arrows oriented from left to right correspond to messages transmitted from the source node for the user data to the node for which these data are intended, and the arrows oriented from right to left correspond to messages transmitted from the user data destination node to the source node for these data.

The eight arrows 401 to 408 in the central column which are placed highest in FIG. 4 correspond to a connected communication mode, and each of the two arrows 410 and 411 placed at the bottom of the central column in FIG. 4 corresponds to a non-connected communication mode.

In connected mode, the first message 401 is sent by the source node 109 of the transmission device 10 to the destination node during the operation 205. The following message is a message 402 returned by the destination node 510. This is a connection initialisation message received by the source node 109 during the operation 206.

The following message is sent by the source node during the operation 209. This is a connection validation message 403.

Then the message including user data is sent by the source node 109 in the form of packets 405 and 406 as described with regard to FIG. 3.

On reception of each of the packets 405 and 406, the destination node reads at least some of the additional information and processes the virtual channel number information 309 and the source node identifier 310 in order to determine whether or not this information is contained in a descriptor of a connection currently valid on the said virtual channel. In the affirmative, this means that the packet has been transmitted in connected mode. In the negative, this means that the packet was transmitted in non-connected mode and, for the first packet of message, the information 304 to 307 must be processed.

Here the packet 405 is a first message packet whereas the packet 406 is not the first message packet and forms part of the same message as the packet 405.

When it receives a packet which is a first message packet, the destination node checks that it has sufficient memory for storing the user data, on the one hand, and whether the stamp is different from the stamp of the previous packet received from the same source node, on the other hand.

When these checks are positive, the destination node sends to the source node an acknowledgement including the same stamp as the packet 401.

Each of the packets 405 and 406 including user data, the destination node 510 returns a packet 407 including acknowledgement information (see FIG. 6), when the user information of the packet under consideration has been correctly received. To this end, the reception device 50 uses the identifier of the transmission device 10 which reads from the header of the packet under consideration, in order to determine the path to be followed by the acknowledgement information on the network. When the user data have not been transmitted correctly, the destination node 510 does not transmit acknowledgement information and the source node 109 then effects a further sending of the packet under consideration.

When all the message user data have been correctly transmitted from the source node to the destination node the source node sends, to the destination node, a connection release message 408.

In non-connected mode, the source node 109 sends, to the destination node, a message including the user information, in the form of packets 410 as illustrated in FIG. 3.

For each of the packets 410 including user data, the destination node 510 returns a packet 411 including acknowledgement information (see FIG. 6), when the user information of the packet 410 has been correctly received. To this end, the reception device 50 uses the identifier of the transmission device 10 which it reads in the header of the packet 405 under consideration, in order to determine the path to be followed by the acknowledgement information on the network. When the user data have not been correctly transmitted, the reception device 50 does not transmit acknowledgement information and the source node 109 then effects a further sending of the packet under consideration.

The reception device depicted in FIG. 5, under the general reference 50, is illustrated in the form of a block diagram. It has, connected together by an address and data bus 502:

a central processing unit 506;
a random access memory RAM 504;
a read only memory ROM 505;
an input/output port 503, on the one hand, serving to receive packets of information which the reception device is to process, store or transmit and, on the other hand, enabling the reception device to transmit all or some of the user information received;
and, independently of the bus 502, a destination node 510 of the network, connected to the input/output port 503, receiving the packets intended for the reception device 50.

Each of the elements illustrated in FIG. 5 is well known to persons skilled in the art of information communication systems and more generally information processing systems. These elements are therefore not described here.

The random access memory 504 stores data, variables and intermediate processing results, in memory registers bearing, in the remainder of the description, the same names as the data whose values they store. The random access memory 504 contains notably:

a register "user_data" in which the user information received is stored, information coming from the input/output port 503.

a register "add_data" in which additional information received with the user information is stored, a register "reverse_add_data" in which additional information to be transmitted is stored, information which notably defines, in its entirety, the path to be followed by the acknowledgement data on the communication network, a register "reverse_route" in which there is stored routing information describing a succession of nodes in the communication network which the acknowledgement data can follow to reach an information transmission device as illustrated in FIG. 1, and a register "descriptors" which will be further explained hereafter.

The read only memory 505 is adapted to store:
the operating program of the central processing unit 506, in a register "program2",
acknowledgement data to be transmitted in return to the transmission device when the user data have been correctly transmitted, in a register "ack_data".

The read only memory 505 constitutes a means of storing information which can be read by a computer or a microprocessor, storing instructions of a computer program, characterised in that it enables the method of the invention to be implemented. According to a variant, the read only memory 505 is removable, partially or totally, and has for example a magnetic tape, a diskette or a fixed-memory compact disc (CD-ROM).

The central processing unit 506 is adapted to implement the flow diagram described in FIGS. 6, 10A and 10B. In FIG. 6 it can be seen that, during an operation 601, the destination node 510, which processes software applications which are not detailed here, receives a packet in the buffer memory of the input/output port 503 and reads the additional data which it contains.

During a test 602, the central unit 506 determines whether the additional virtual channel number information 309 and additional source node identifier information 310 are identical to that of a packet already received. To this end, the additional virtual channel number information and additional source node identifier information for each current connection are stored in the random access memory 504 (see operation 608 below) and serve as so-called "reference" data for the comparison made during the operation 602. When the result of the test 602 is positive, during an operation 603, the central unit 506 considers the descriptors present in the random access memory 504, that is to say the data structures in memory representing, on the one hand, the virtual channel used and, on the other hand, the identifier for the source node and also for the transmission mode and information necessary for the correct reception of the message. These descriptors are structured and used in a manner known to persons skilled in the art of network communications.

When the result of the test 602 is negative, during an operation 604, the central unit 506 reads, amongst the user data of the packet received, that is to say in fact in the message header 303, the protocol identification information 304 and the message size information 305.

Then, during an operation 605, the central unit 506 reserves part of the random access memory 504 sufficient to store the entire message to be received from the source node, according to the value of the message size information 305.

Next, during a test 606, the central unit 506 determines whether or not the memory reservation has been effected correctly. When the result of the test 606 is negative, during an operation 607, the packet received is abandoned, that is to say no additional processing is performed, neither on its user data nor on its additional data, and the operation 601 is reiterated.

When the result of the test 606 is positive or following the operation 603, during an operation 608, the central unit 506 stores the packet received in the space reserved for this purpose, during an operation 605, in the random access memory 504. During the same operation 608, the additional virtual channel number information and additional source node identifier information for the current connection are stored in the register "add_data" of the random access memory 504. Then, during a test 609, the central unit 506 determines whether this storage has taken place correctly, by checking the integrity of the packet, for example by means of parity bits or error correction codes, in a known manner. When the result of the test 609 is negative, the operation 607 is reiterated. When the result of the test 609 is positive, during a test 610, the central unit 506 determines whether or not a transmission mode is made reliable. When the result of the test 610 is positive, during an operation 611, the central unit 506 requires the formation of the header for the acknowledgement packet 315, determining the virtual channel to be used and the path which the acknowledgement packet is to follow in order to reach the source node, and recovers the stamp of the received packet so that the stamp of the acknowledgement packet is identical to it. During this operation 611, the central unit 506 sends the acknowledgement packet thus formed.

When the result of the test 610 is negative or following the operation 611, during a test 612, the central unit 506 determines whether or not the packet received was the last packet of the message, by determining whether or not the end of message information 313 is in the user data of the packet received. When the result of the test 612 is positive, during an operation 613:

the central unit 506 notifies the software application identified by the protocol identifier PID 304 that a message has been received from the source node, in the case of a message reception in non-connected mode, the central unit 506 erases, in the register "add_data" the additional virtual channel number information and additional source node identifier information for the message, and in the case of reception of a release message (408, in FIG. 4), the central unit 506 erases, in the register "add_data", the additional virtual channel number information and additional source node identifier information for the message.

When the result of the test 612 is negative, the central unit returns to the operation 601.

During a message sending phase (FIG. 7), after having awaited a message to be transmitted in accordance with the present invention, operation 701, the central unit 106 (FIG. 1) writes a packet header in the register "add_data" of the random access memory 104, operation 702. Next, during a test 703, the central unit 106 determines whether or not the message is to be sent in connected mode.

When the result of the test 703 is negative, during a test 704, the central unit 106 determines whether or not the packet under consideration is the first packet of the message. When the result of the test 704 is positive, during an operation 705, the central unit 106 writes the message header in the register "user_data" of the random access memory 104. Following the operation 105 or when the result of the test 704 is negative, during an operation 706, the central unit 106 completes the user data in the register "user_data" and sends, in non-connected mode, the packet including the additional data stored in the register "add_data" and then the user data stored in the register "user_data", according to known techniques which are not restated here.

When the result of the test 703 is positive, during an operation 707, the central unit 106 completes the user data in the register "user_data" and sends in connected mode, according to known techniques which are not restated here.

Following one of the operations 706 or 707, during a test 708, the central unit 106 determines whether or not the packet under consideration is the last packet of the message. When the result of the test 708 is negative, the operation 702 is reiterated. When the result of the test 708 is positive, the operation 701 is reiterated.

The description hereunder concerns a second aspect of the invention.

It must be noted that all that has been described with respect to FIGS. 1, 3 and 5 in relation with the first aspect of the invention remains valid as regards the second aspect of said invention.

As previously mentioned, the central processing unit 106 of FIG. 2 is also adapted to implement the flow diagram described in FIG. 8. In this FIG. 8 it can be seen that, during an operation 800, the central unit 106 is in an operating state which does not require connection to the network, and then, during an operation 801, it receives, from a software application, a request for communication of a message intended for a destination node on the network. After reception of this request, the central unit 106 initiates the communication in the transmission device 10 of FIG. 2, according to known methods. Then the central unit 106 adds, in the register "add_data" of the random access memory 104, the route information 308 (see FIG. 3) which the packet must follow to reach the destination node.

During an operation 802, the central unit 106 adds, in the register "add_data" of the random access memory 104, a virtual channel identifier 309 (see FIG. 3).

During an operation 803, the central unit 106 adds, in the register "add_data" of the random access memory 104, a new stamp 311 (see FIG. 3), the binary value of which is different from that of the stamp associated with the previous packet sent by the source node on the same virtual channel.

During an operation 804, the user data to be sent are received from the software application which sent the request, during the operation 801, and stored in the register "user_data" of the random access memory 104.

During an operation 805, the packet consisting of the additional data and user data is sent over the network.

During an operation 806, the central unit awaits the reception of an acknowledgement from the destination node, for a predetermined period. When this period has elapsed, the central unit 106 performs a test 807, during which it determines whether or not an acknowledgement has been received from the destination node.

When the result of the test 807 is negative, the operation 805 is reiterated. When the result of the test 807 is positive, during a test 808, the central unit 106 determines whether or not the stamp contained in the acknowledgement is identical to the stamp of the transmitted packet.

When the result of the test 808 is negative, the operation 805 is reiterated. When the result of the test 808 is positive, during a test 809, the central unit 106 determines whether or not the packet sent was the last packet of the message. When the result of the test 809 is negative, the operation 801 is reiterated.

When the result of the test 809 is positive, the operation 800 is reiterated, which has the effect of advising the software application that the user data have been correctly transmitted to the destination node.

In FIG. 9, there can be seen, indicated by downward sloping arrows placed in a central column, messages transmitted over the network, between a source node 10, on the left, and a destination node 50 (see FIG. 5), on the right. The arrows oriented from left to right correspond to packets transmitted from the source node for the user data to the node for which these data are intended, and the arrows oriented from right to left correspond to packets transmitted from the user data destination node to the source node for these data.

The four arrows 901 to 904 in the central column correspond to a communication mode according to the present invention. The first packet 901 is sent by the source node 10 or transmission device 10, to the destination node, during the operation 805. Next, the destination node 50 which receives the packet checks that it has sufficient memory to store the user data, on the one hand, and whether the stamp is different from the stamp of the previous packet received from the same source node (see tests 1003 and 1006 in FIG. 10A).

When these checks are positive, the destination node sends to the source node an acknowledgement 902 including the same stamp as the packet 901.

At the same time, the source node awaits reception of an acknowledgement from the destination node (operation 806, FIG. 8) and, at the end of this period, since it has received the acknowledgement 902, it checks that the acknowledgement stamp is identical to the stamp of the packet 901 (test 808, FIG. 8). When this check is positive, and if it has another packet to send to the destination node, the source node sends a new packet 903, having a stamp with a different value from the stamp of the packet 901.

In the case depicted, it is assumed that the destination node then no longer has sufficient memory available to store the user data of the packet 903. In this case, it ignores the packet 903 and sends no acknowledgement to the source.

At the end of the waiting period provided for the operation 806, the source node then determines that it has not received an acknowledgement and proceeds with a new transmission of the packet 901, in the form of the packet 904.

As previously mentioned, the central processing unit 506 of FIG. 5 is adapted to implement the flow diagram described in FIGS. 10A and 10B. In FIG. 10A it can be seen that, during an operation 1001, the destination node 510, which processes software applications which are not detailed here, receives a packet in the buffer memory of the input/output port 503 and reads the additional data which it contains.

During an operation 1002, the central unit 506 considers the stamp contained in the received packet and the virtual channel identifier and the source node identifier. During a test 1003, the central unit 506 determines whether the stamp received is identical to the stamp previously received from the same source node, on the same virtual channel.

It should be noted here that the stamp alternately takes different values for each of the virtual channels. Thus, by using two different virtual channels, the source node can use two identical stamps, but not between two successive packet transmissions using the same virtual channel, the stamps necessarily take two different values.

When the result of the test 1003 is positive, the operation 1001 is reiterated. When the result of the test 1003 is negative, during a test 1004, the central unit 506 determines whether or not the packet under consideration is a first packet of a message, determining whether or not the message header 303 is in the packet under consideration.

When the result of the test 1004 is positive, the operation 1005 consists of reserving sufficient memory space for storing the entire message, in the random access memory 504.

During a test 1006, the central unit 506 next determines whether or not the memory reservation has indeed been effected, that is to say whether or not the necessary memory space was available, in the random access memory 504.

When the result of the test 1006 is negative, the operation 1001 is reiterated. When the result of the test 1006 is positive or when the result of the test 1004 is negative, during an operation 1007, the packet under consideration is stored at a memory in the part reserved for this purpose, in the random access memory 504.

Next, during a test 1008, the central unit determines whether or not the storage has taken place correctly. For this purpose, the central unit 506 checks the integrity of the packet by means known to persons skilled in the art, for example using parity bits or error correction codes.

When the result of the test 1008 is positive, the operation 1001 is reiterated. When the result of the test 1008 is negative, during an operation 1009 (FIG. 10B), the central unit 506 determines the route information 317 and the virtual channel so that the acknowledgement packet reaches the source node identified by the source node identifier 310 of the received packet and puts this route information and the virtual channel information in the register "add_data" of the random access memory 504.

During an operation 1010, the central unit 506 copies the stamp of the received packet into the register "add_data" of the random access memory 504.

During an operation 1011, the central unit 506 sends the packet consisting of information stored in the register "add_data" of the random access memory 504, to the source node.

Finally, the central unit returns to the operation 1001.

The invention claimed is:

1. A sending method of sending a data packet from a source node to a destination node through a switching network, the data packet including user data and additional data, said method comprising the steps of:

determining a routing header defining a path to be followed on the network by the data packet, wherein the determining step is performed independently of the transmission mode of the data packet, connected or non-connected, selecting a virtual channel representing a connection between the source node and the destination node; and sending data packet with additional data, said additional data comprising the routing header, the selected virtual channel and an identifier of the source node, wherein the combination of the virtual channel and the source node identifier makes the connection unique in the switching network, and wherein data representing at least one of the virtual channel and the source node identifier allows the destination node to determine the transmission mode of the data packet, connected or non-connected.

2. A sending method according to claim 1, wherein the data packet includes route information representing each node on the defined path in the network through which the user data must pass in order to reach the destination node.

3. A reception method of receiving a data packet transmitted from a source node to a destination node through a switching network, the switching network being adapted to carry data in a connected mode and a non-connected mode, the data packet including user data and additional data, wherein additional data comprising a virtual channel, a source node identifier and a routing header, said routing header defining a path for the data packet on the network and being determined independently of the transmission mode of the data packet, connected or non-connected, said reception method comprising the steps of:

reading the additional data; and determining the transmission mode of the data packet, connected or non-connected, on the basis of data representing at least one of the virtual channel and the source node identifier.

4. A reception method according to claim 3, wherein the destination node has a memory in which additional reference data are stored and said determining step includes comparing additional reference data and the additional data read in said reading step.

5. A reception method according to claim 4, wherein during said determining step, the transmission mode is determined as connected when the additional reference data and the read additional data are identical.

6. A reception method according to claim 3, wherein, when during said determining step, it is determined that the transmission mode is non-connected, said reception method further comprises the step of reading, in a first packet, the size of a message to be received from the source node, the first packet being one from several packets constituting the message.

7. A reception method according to claim 6, further comprising the step of reserving sufficient memory to store the entire message according to the read size of the message.

8. A reception method according to claim 7, further comprising the step of erasing the additional data after said reserving step has been performed.

9. A reception method according to claim 3, further comprising the step of sending an acknowledgment packet to the source node, the acknowledgment packet including the virtual channel used for acknowledging reception.

10. A sending device for sending a data packet from a source node to a destination node through a switching network, the data packet including user data and additional data, said device comprising:

determination means for determining a routing header defining a path to be followed on the network by the data packet, wherein the determination is performed independently of the transmission mode of the data packet, connected or non-connected;

selection means for selecting a virtual channel representing a connection between the source node and the destination node; and sending means for sending the data packet with additional data, said additional data comprising the routing header, the selected virtual channel and an identifier of the source node, wherein the combination of the virtual channel and the source node identifier makes the connection unique in the switching network, and wherein data representing at least one of the virtual channel and the source node identifier allows the destination node to determine the transmission mode of the data packet, connected or non-connected.

11. A sending device according to claim 10, wherein the data packet includes route information representing each node on the defined path in the network through which the user data must pass in order to reach the destination node.

12. A reception device for receiving a data packet transmitted from a source node to a destination node through a switching network, the switching network being adapted to carry data in a connected mode and a non-connected mode, the data packet including user data and additional data, wherein additional data comprising a virtual channel, a source node identifier and a routing header, said routing header defining a path for the data packet on the network and being determined independently of the transmission mode of the data packet, connected or non-connected, said device comprising:

first reading means for reading the additional data; and determination means for determining the transmission mode of the data packet, connected or non-connected, on the basis of data representing at least one of the virtual channel and the source node identifier.

13. A reception device according to claim 12, wherein the destination node has a memory in which additional reference data are stored and said determination means includes comparison means for comparing the additional reference data and the additional data read by said first reading means.

14. A reception device according to claim 13, wherein the transmission mode is determined as connected when the additional reference data and the read additional data are identical.

15. A reception device according to claim 12, further comprising second reading means for reading, when the transmission mode is non-connected, in a first packet, the size of a message to be received from the source node, the first packet being one from among several packets constituting the message.

16. A reception device according to claim 15, further comprising reservation means for reserving sufficient memory to store the entire message according to the read size of the message.

17. A reception device according to claim 16, further comprising erasing means for erasing the additional data.

18. A reception device according to claim 12, further comprising sending means for sending an acknowledgment packet to the source node, the acknowledgment packet including the virtual channel used for acknowledging reception.

* * * * *

UNITED STATES PATENT AND TRADEMARK OFFICE
CERTIFICATE OF CORRECTION

PATENT NO. : 7,075,937 B1  Page 1 of 1
APPLICATION NO. : 09/314119
DATED : July 11, 2006
INVENTOR(S) : Yacine Smail El Kolli It is certified that error appears in the above-identified patent and that said Letters Patent is hereby corrected as shown below:

COLUMN 7:

Line 4, "network" should read --network,--; and
Line 8, "adapted" should read --adapted:--.

COLUMN 8:

Line 41, "to the path" should read --the path to--.

COLUMN 9:

Line 22, "route" a" should read --"route", a--;
Line 30, "has" should read --have--; and
Line 32, "said" should read --sent--.

COLUMN 17:

Line 5, "sending" should read --sending the--; and
Line 26, "net" should read --net- --.

Signed and Sealed this

Nineteenth Day of June, 2007

JON W. DUDAS
*Director of the United States Patent and Trademark Office*